US008965701B2

(12) United States Patent
Wessling et al.

(10) Patent No.: US 8,965,701 B2
(45) Date of Patent: Feb. 24, 2015

(54) SYSTEM AND METHOD FOR AUTOMATIC DETECTION AND ANALYSIS OF BOREHOLE BREAKOUTS FROM IMAGES AND THE AUTOMATIC GENERATION OF ALERTS

(75) Inventors: Stefan Wessling, Lower Saxony (DE); Jianyong Pei, Katy, TX (US)

(73) Assignee: Baker Hughes Incorporated, Houston, TX (US)

(*) Notice: Subject to any disclaimer, the term of this patent is extended or adjusted under 35 U.S.C. 154(b) by 783 days.

(21) Appl. No.: 13/191,016

(22) Filed: Jul. 26, 2011

(65) Prior Publication Data

US 2012/0097450 A1 Apr. 26, 2012

Related U.S. Application Data

(60) Provisional application No. 61/394,845, filed on Oct. 20, 2010.

(51) Int. Cl.
*G01V 1/50* (2006.01)
*G01V 5/04* (2006.01)
*E21B 47/00* (2012.01)

(52) U.S. Cl.
CPC .............. *G01V 5/04* (2013.01); *E21B 47/0002* (2013.01)
USPC ............................................................ 702/6

(58) Field of Classification Search
CPC .................................................. E21B 47/0002
USPC ............................................................ 702/6
See application file for complete search history.

(56) References Cited

U.S. PATENT DOCUMENTS

| 4,837,753 | A  | * | 6/1989 | Morris et al. ................ 367/69 |
| 6,179,069 | B1 | * | 1/2001 | Zheng ............................. 175/65 |
| 6,678,616 | B1 |   | 1/2004 | Winkler et al. |
| 8,270,250 | B2 | * | 9/2012 | Bonavides et al. ........... 367/69 |

(Continued)

FOREIGN PATENT DOCUMENTS

WO        0135124 A1     5/2001

OTHER PUBLICATIONS

Notification of Transmittal of the International Search Report and the Written Opinion of the International Searching Authority, or the Declaration; PCT/US2013/022368; May 8, 2013.

(Continued)

*Primary Examiner* — Sujoy Kundu
*Assistant Examiner* — Steven J Malone
(74) *Attorney, Agent, or Firm* — Cantor Colburn LLP

(57) ABSTRACT

Disclosed is a method for detecting a pair of opposing breakouts in a borehole penetrating an earth formation. The method includes: conveying a downhole tool configured to perform measurements of a property of the earth formation; producing an image of the earth formation from the measurements, the image comprising a plurality of sectors; dividing the sectors into radial segments, each segment corresponding to an opposite segment; rotating the segments at least one sector at a time until a specified angle is achieved; calculating an average value for the measurements associated with each segment for each rotation of the segments; stacking the average values for opposing segments to produce stack values; determining a maximum or minimum stack value; determining if the maximum or minimum stack value exceeds a threshold value; and detecting the first breakout and the second breakout if the maximum or minimum stack value exceeds the threshold value.

29 Claims, 8 Drawing Sheets

(56) References Cited

U.S. PATENT DOCUMENTS

| | | | |
|---|---|---|---|
| 2005/0216197 | A1 | 9/2005 | Zamora et al. |
| 2006/0106541 | A1 | 5/2006 | Hassan et al. |
| 2008/0190190 | A1 | 8/2008 | Tan et al. |
| 2008/0201079 | A1 | 8/2008 | Castillo |
| 2009/0055097 | A1* | 2/2009 | Kowalik et al. .................. 702/6 |
| 2009/0065252 | A1* | 3/2009 | Moos et al. ..................... 175/50 |
| 2009/0141943 | A1* | 6/2009 | Liu ............................... 382/109 |
| 2009/0185446 | A1* | 7/2009 | Zheng et al. .................... 367/31 |
| 2010/0238764 | A1* | 9/2010 | Pistre et al. ..................... 367/25 |
| 2010/0286918 | A1* | 11/2010 | Moos et al. ..................... 702/12 |
| 2011/0069872 | A1* | 3/2011 | Martel et al. .................. 382/110 |
| 2011/0080806 | A1* | 4/2011 | Normann ........................ 367/35 |
| 2011/0091078 | A1* | 4/2011 | Kherroubi et al. ............. 382/109 |
| 2011/0153296 | A1* | 6/2011 | Sadlier et al. ..................... 703/7 |
| 2011/0240292 | A1* | 10/2011 | Dusterhoft et al. ......... 166/280.1 |
| 2012/0169842 | A1* | 7/2012 | Chuang et al. .................. 348/39 |
| 2012/0192640 | A1* | 8/2012 | Minh et al. ................. 73/152.16 |
| 2012/0217008 | A1* | 8/2012 | Moos et al. .............. 166/250.01 |

OTHER PUBLICATIONS

Notification of Transmittal of the International Search Report and the Written Opinion of the International Searching Authority, or the Declaration; PCT/US2011/050957; Apr. 10, 2012.

Liu et al. "Stacking Seismic Data Using Local Correlation," Geophysics, (May-Jun. 2009), vol. 74, No. 3, pp. V43-V48.

Prensky, Stephen. Borehole Breakouts and In-situ Rock Stress—A Review. The Log Analyst, May-Jun. 1992, pp. 304-312.

Wessling, Challenges and Solutions for Automated Wellbore Status Monitoring—Breakout Detection as an Example, Conference Paper, Apr. 19-21, 2011, SPE 146298 Society of Petroleum Engineers.15 pages.

Sadlier, Automated Alarms for Managing Drilling Pressure and Maintaining Wellbore Stability New Concepts in While-Drilling Decision Making. SPE 146298, SPE Technical Conference and Exhibition held in Denver, Colorado, USA, Oct. 30-Nov. 2, 2011. 9 pages.

* cited by examiner

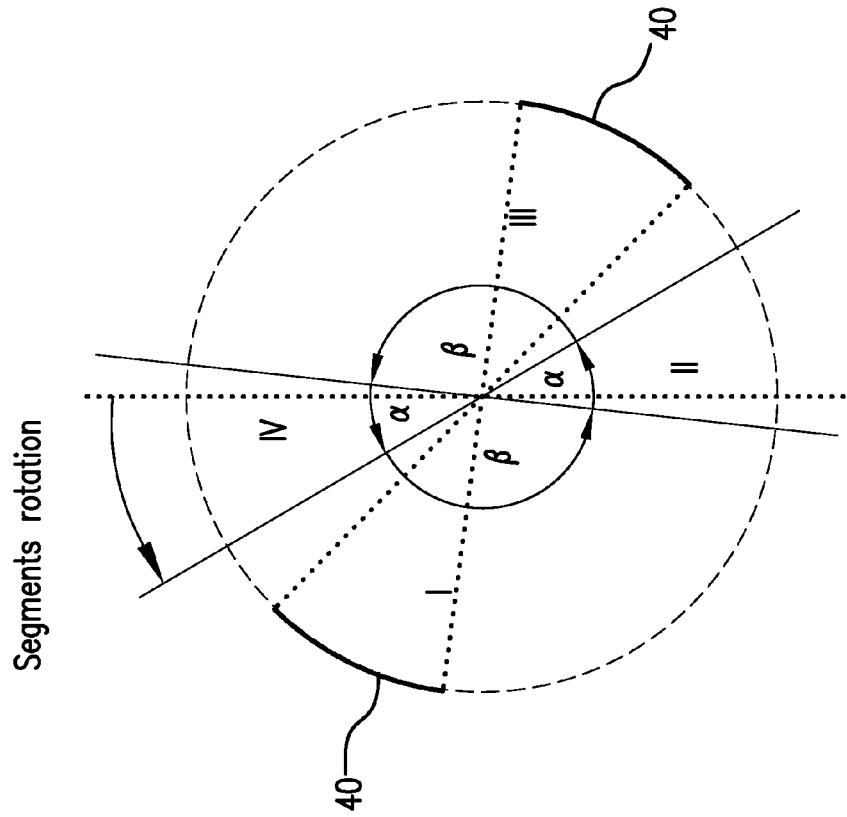
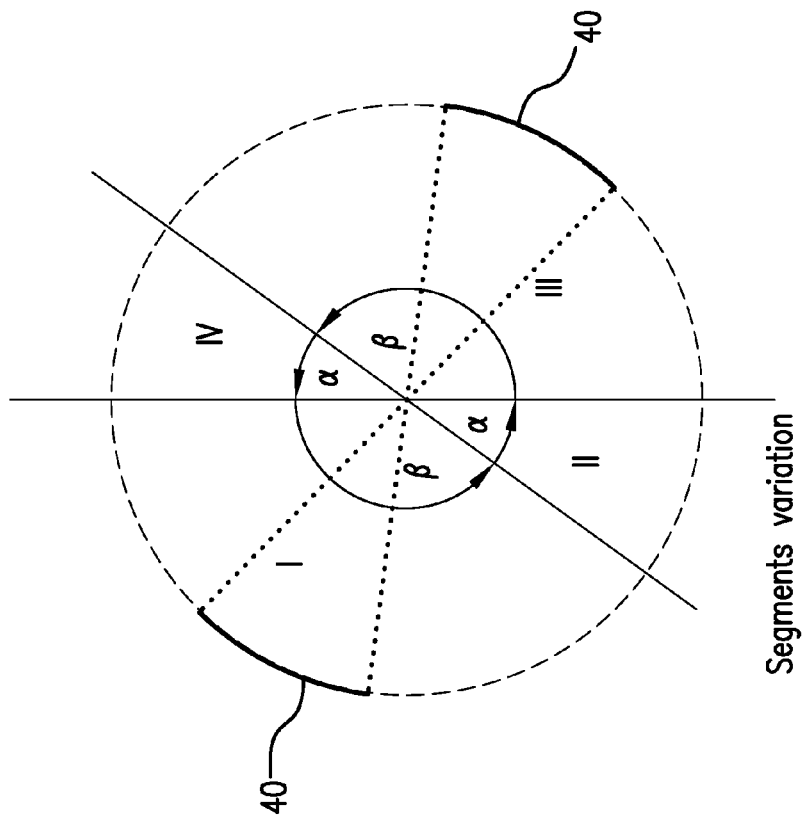

SYSTEM AND METHOD FOR AUTOMATIC DETECTION AND ANALYSIS OF BOREHOLE BREAKOUTS FROM IMAGES AND THE AUTOMATIC GENERATION OF ALERTS

CROSS REFERENCE TO RELATED APPLICATIONS

This application claims the benefit of an earlier filing date from U.S. Provisional Application Ser. No. 61/394,845 filed Oct. 20, 2010, the entire disclosure of which is incorporated herein by reference.

BACKGROUND

1. Field of the Invention

The present invention generally relates to drilling boreholes and, particularly, to identifying breakouts therein.

2. Description of the Related Art

Boreholes are drilled into the earth for many applications such as hydrocarbon production, geothermal production and carbon dioxide sequestration. A borehole is drilled with a drill bit or cutting tool disposed at the distal end of a drill string. A drilling rig turns the drill string and the drill bit to cut through formation rock and, thus, drill the borehole.

Ideally, the drilled borehole is somewhat smooth without interruptions that could cause borehole instability and impede further drilling. Lack of borehole stability can result in reduction in the quality of well log records and, consequently, difficulties in interpreting them. In addition, lack of borehole stability can cause mechanical problems such as stuck pipes, high torque and back-reaming, initiating further problems when setting the casing and removing cuttings. Unfortunately, the drilling process can re-distribute stresses in the formation around the borehole resulting in borehole instability, which can lead to parts of a borehole wall to breaking out of the formation and causing indentations in the borehole wall. This condition is referred to as a "breakout." It would be well received in the drilling art if drilling operators and site engineers could be alerted to the occurrence of breakouts during the drilling process in order to prevent further drilling and completion problems.

BRIEF SUMMARY

Disclosed is a method for detecting a pair of opposing breakouts in a borehole penetrating an earth formation. The method includes: conveying a downhole tool configured to perform measurements of a property of the earth formation; producing an image of the earth formation from the measurements, the image comprising a plurality of sectors; dividing the sectors into radial segments, each segment corresponding to an opposite segment; rotating the segments at least one sector at a time until a specified angle is achieved; calculating an average value for the measurements associated with each segment for each rotation of the segments by at least one sector; stacking the average values for opposing segments to produce stack values; determining a maximum or minimum stack value; determining if the maximum or minimum stack value exceeds a threshold value; and detecting the first breakout and the second breakout if the maximum or minimum stack value exceeds the threshold value.

Also disclosed is an apparatus for detecting a first breakout and a second breakout shifted approximately 180° apart from the first breakout in a borehole penetrating an earth formation. The apparatus includes a processor and a downhole tool configured to be conveyed through the borehole, to perform measurements of a property of the earth formation, and to produce an image of the earth formation from the measurements, the image comprising a plurality of sectors. The processor is configured to implement a method comprising: receiving the image; dividing the sectors into a plurality of radial segments, each segment corresponding to an opposite segment; rotating the segments at least one sector at a time until a specified angle is achieved; calculating an average value for the measurements associated with each segment for each rotation of the segment by at least one sector; stacking the average values for opposing segments to produce stack values; determining a maximum or minimum stack value; determining if the maximum or minimum stack value exceeds a threshold value; and detecting the first breakout and the second breakout if the maximum or minimum stack value exceeds the threshold value.

Further disclosed is a non-transitory computer-readable medium comprising computer-executable instructions for detecting a first breakout and a second breakout shifted approximately 180° apart from the first breakout in a borehole penetrating an earth formation by implementing a method. The method includes: receiving an image of the earth formation created from measurements of a property of the earth formation using a downhole tool conveyed in the borehole, the image comprising a plurality of sectors; dividing the sectors into a plurality of radial segments, each segment corresponding to an opposite segment; rotating the segments at least one sector at a time until a specified angle is achieved; calculating an average value for the measurements associated with each segment for each rotation of the segment by at least one sector; stacking the average values for opposing segments to produce stack values; determining a maximum or minimum stack value; determining if the maximum or minimum stack value exceeds a threshold value; and detecting the first breakout and the second breakout if the maximum or minimum stack value exceeds the threshold value.

BRIEF DESCRIPTION OF THE DRAWINGS

The following descriptions should not be considered limiting in any way. With reference to the accompanying drawings, like elements are numbered alike:

FIGS. 6A and 6B, collectively referred to as FIG. 6, depict aspects of rotating angular segments having unequal angles;

DETAILED DESCRIPTION

Figure 1:
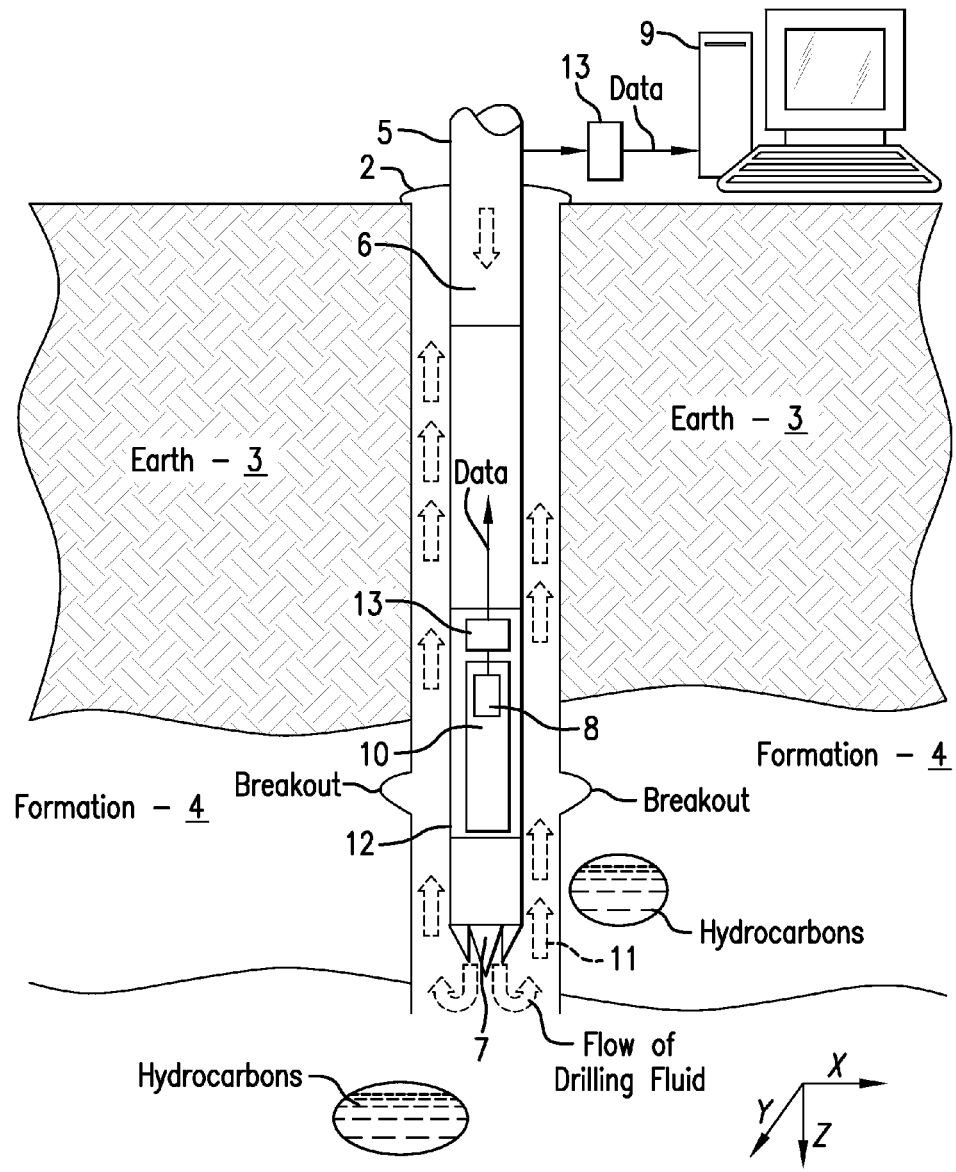
FIG. 1 illustrates an exemplary embodiment of a downhole imaging tool disposed in a borehole penetrating the earth.

A detailed description of one or more embodiments of the disclosed apparatus and method presented herein by way of exemplification and not limitation with reference to the Figures.

Drilling boreholes causes the in-situ Earth stresses to re-distribute around the borehole. If the load applied by the annular pressure of the drilling fluid against the borehole wall becomes excessively low and/or the temperature is sufficiently increased in the formation around the borehole, the re-distributed shear stress exceeds the rock strength by which parts of the borehole wall break out of the formation to form indentations in the borehole wall. These indentations are termed breakouts.

In many cases, breakouts occur in pairs approximately 180° apart on a borehole image. If the in-situ stress around the borehole is anisotropic, so that the principle stresses are of unequal magnitude, the breakouts develop in the direction of the least principle stress. The width of each breakout generally varies as a function of rock strength and the magnitudes of the re-distributed stresses.

Detection of breakouts on images of the borehole wall provides a way to constrain in-situ Earth stress magnitudes and orientation as well as the rock strength, which are necessary prerequisites to predict wellbore stability. Such a function is of particular relevance for long horizontal wells (where the vertical stress largely exceeds the horizontal stress) and for drilling through unconsolidated sediments. Once breakouts are identified, remedial actions can be performed to circumvent drilling hazards. In addition, the subsequent calibration of the in-situ Earth stresses improves the safety of continuous drilling by updating the pressure window used by drilling operators and engineers.

Disclosed herein are techniques for detecting breakouts by analyzing an image of a borehole wall penetrating a geologic formation generally formed of rock. The image is generally a data set of measurements of properties of the formation. Variations in the values of the measurements can be plotted to create an image of the formation. In addition to detecting breakouts, the techniques include providing an alert automatically to the drilling operators and engineers if breakouts are detected while drilling a borehole. Also in addition to detecting breakouts, the orientation and the width of the detected breakouts are delivered as an output of the applied technique. In addition to delivering the orientation and width of a single breakout at one particular depth location, an average width and orientation, averaged over a depth interval where breakouts exist can also be delivered as an output of the applied technique.

Except for delivering the average width and orientation for a depth interval, the techniques presented herein are applicable to one single image row at one particular depth, irrespective of the amount of sectors (pixel values) contained in the row. Hence, images from different acquisition technologies and with different resolutions can be automatically analyzed. Delivering the average width and orientation for a depth interval requires a depth-based analysis over more than one image row.

In one embodiment, the analysis is performed downhole in the downhole tool acquiring the image data. Because the acquired images can be data-intensive and a downhole telemetry system may have limited bandwidth, downhole analysis can provide for alerting the drilling operators and engineers of breakouts more quickly than if the analysis was performed at the surface of the earth. For embodiments with high-speed broadband telemetry, surface processing and analysis of the image data can also be performed.

FIG. 1 illustrates an exemplary embodiment of a downhole tool 10 disposed in a borehole 2 penetrating the earth 3, which includes an earth formation 4. The formation 4 represents any subsurface material of interest penetrated by the borehole 2. The downhole tool 10 is conveyed through the borehole 2 by a carrier 5. In the embodiment of FIG. 1, the carrier 5 is a drill string 6 that includes a drill bit 7 in an operation referred to as logging-while-drilling (LWD). The downhole tool 10 in one embodiment is disposed in a bottom-hole assembly 12 behind the drill bit 7. Drilling fluid 11 is pumped through the drill string 6 and is used to lubricate and cool the drill bit 7, and to flush rock cuttings from the borehole 2. In another embodiment, the carrier 5 can be an armored wireline in an operation referred to as wireline logging. In wireline logging, the wireline conveys the downhole tool 10 through the borehole 2 and can provide a communications medium for communicating data or commands between the tool 10 and surface communicator.

Still referring to FIG. 1, the downhole tool 10 includes downhole electronics 8 configured to process data obtained by the downhole tool 10. Processed data can be transmitted to a surface computer processing system 9 by way of a telemetry system 13. Non-limiting embodiments of the telemetry system 13 include pulsed-mud, wired drill pipe having a broadband coaxial cable or a fiber optic cable, acoustic transmission, and radio transmission. In one embodiment, the surface computer processing system 9 is configured to store data in a database and prepare, process, and visualize data for subsequent analysis and interpretation. The analysis and interpretation of the acquired data to deliver an image of the borehole wall versus depth is performed by application engineering software, which includes appropriate algorithms. The application engineering software can be implemented by the downhole electronics 8 and/or the surface computer processing system 9.

Figure 2:
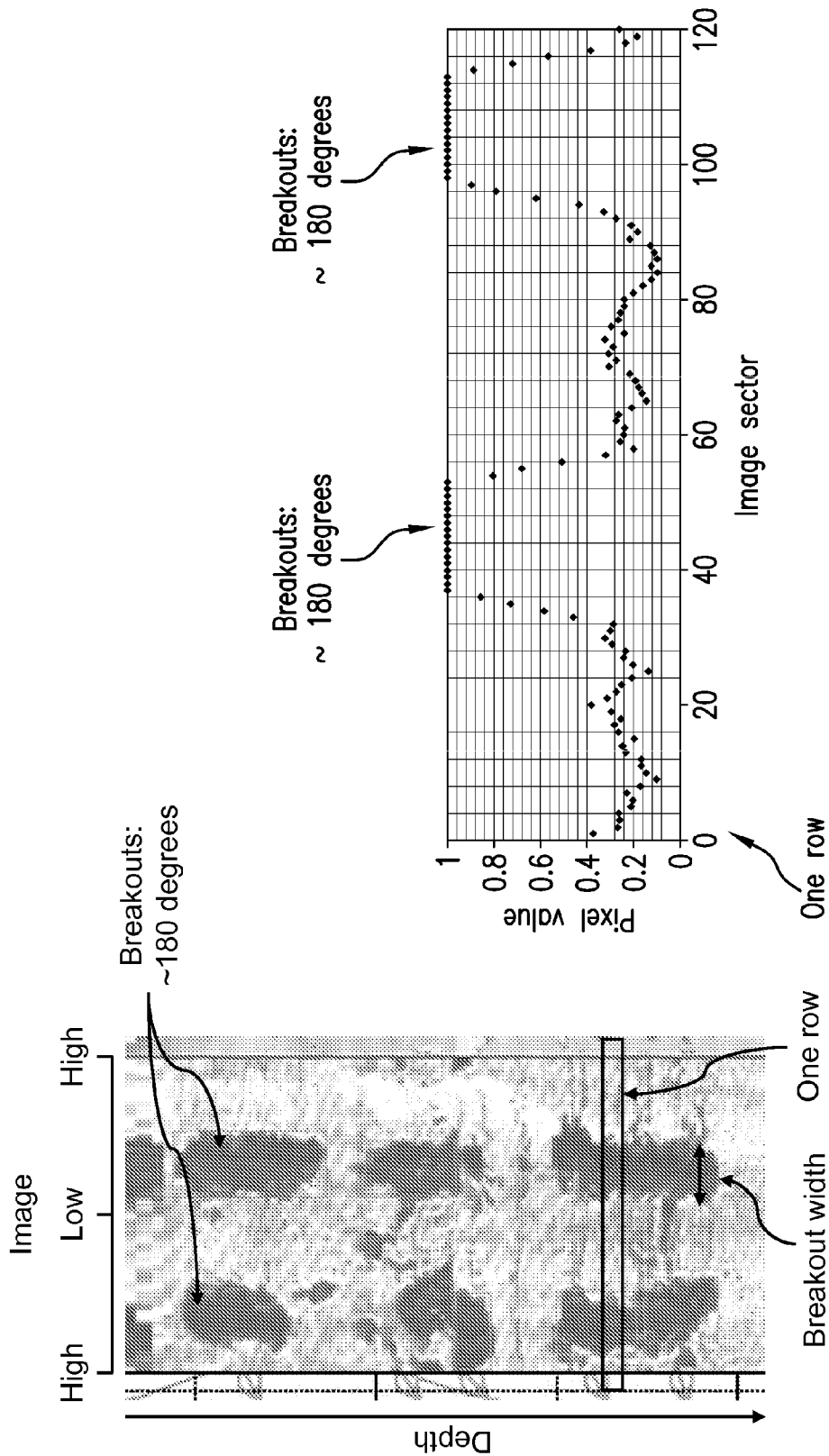
FIG. 2 depicts aspects of an image of a borehole having breakouts.

The application engineering software performs an automatic analysis of images of the borehole wall to monitor the existence or non-existence of borehole breakouts (see FIG. 2 for example of breakouts). If breakouts exist, an alert is provided to a user in addition to relevant parameters such as the measured depth of the breakout, breakout orientation, and breakout width, which are delivered to a user for further processing and analysis, such as for the calibration of in-situ earth stresses or to perform environmental corrections, etc.

The downhole tool 10 is configured to measure a property of the formation 4. Non-limiting examples of the property include gamma ray emission, acoustic impedance, resistivity (or its inverse conductivity), density, or porosity. Measurements of the property are performed in circumferential direction around the borehole wall (i.e., radial measurements around the circumference) and at various depths in the borehole 2, generally while the downhole tool 10 is being conveyed through the borehole 2. However, movement of the tool 10 can be halted while a measurement is being performed. The measurements are grouped into a data set. Variations in values of the measured property in the data set can be displayed as an image. Accordingly, the term "image" as used herein can refer to a visual image or the data set that can be used to create an image.

FIG. 2 on the left shows an example of breakouts on an image of the borehole wall. The image of the borehole is an azimuthal/circumferential representation of a physical property of the formation at or close to the borehole wall (depending on the depth of penetration for a specific acquisition technology). The magnitude of the physical property at a specific borehole location is stored as a pixel value. The image is a graphical color-coded representation of the pixel values with different shades of color representing different pixel values, although shown herein as a black and white image.

Breakouts (i.e., an enlarged borehole at opposite locations) on an image become visible due to an increased distance between a sensor in the downhole tool 10 that measures the physical property and the borehole wall. If the distance becomes too large, the sensor is not able to determine the physical property of the rock anymore.

In FIG. 2 on the left, the dark or shaded areas are the observed borehole breakouts, whereas light areas represent intact formation rock. As noted above, the breakouts appear in pairs in most depth intervals, approximately 180 degrees apart from each other.

FIG. 2 on the right shows an example of normalized pixel values for one row of the image. Breakouts in FIG. 2 are represented by a pixel value of one (y-axis). For the presented image, each row of the image contains 120 sectors, i.e., 120 pixels, one pixel value per sector (x-axis).

The techniques disclosed herein present an algorithm for performing an automatic analysis of images from the borehole wall to monitor the existence or non-existence of borehole breakouts. If breakouts exist, relevant parameters (breakout orientation and breakout width) are delivered for further processing and analysis, such as for the calibration of the in-situ Earth stresses.

Figure 3:
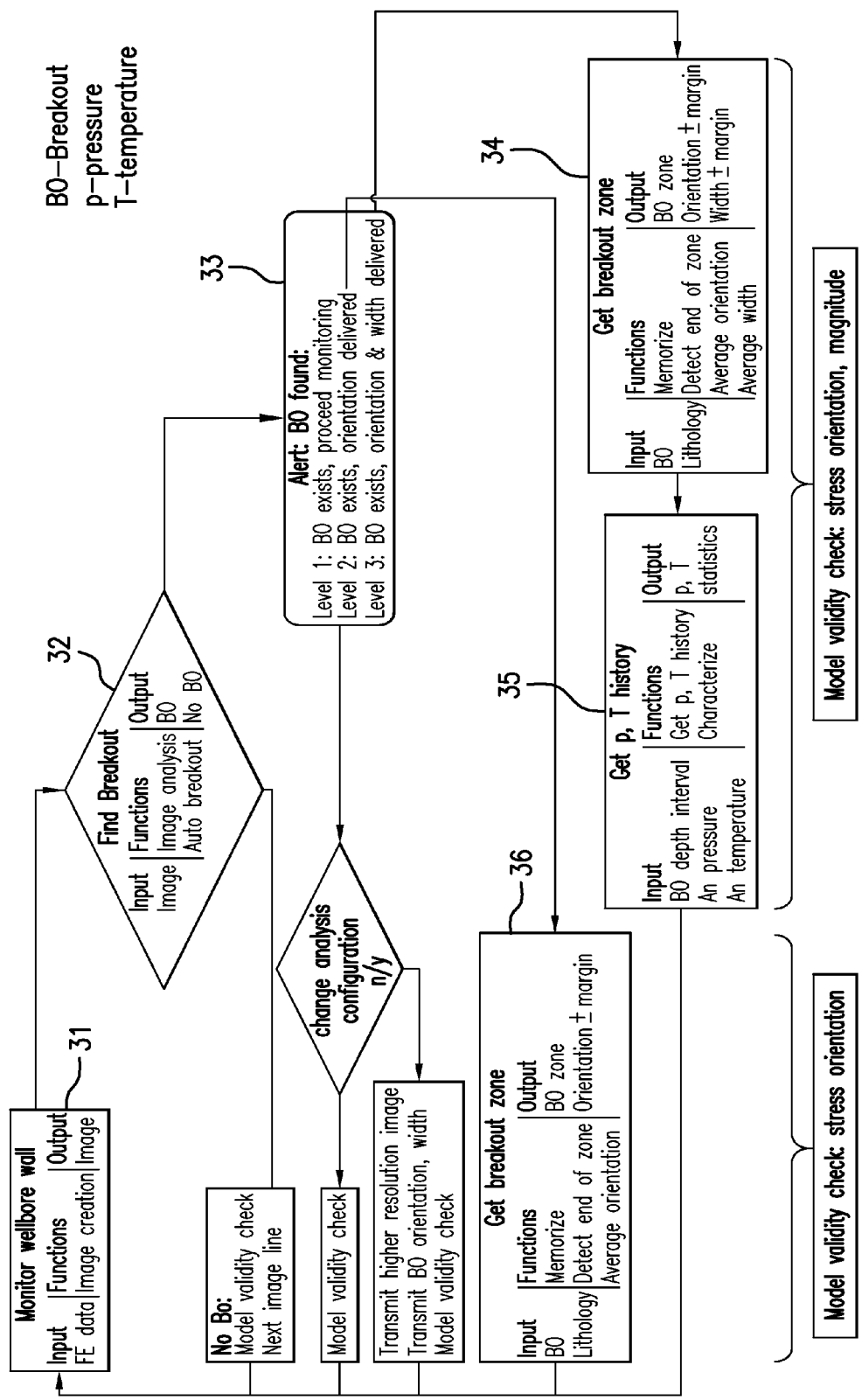
FIG. 3 depicts aspects of processing and analyzing image data to detect the breakouts.

FIG. 3 illustrates one example of workflow for the engineering application software. The presence or absence of breakouts can be verified from images of the borehole wall. A pre-requisite of the presented algorithm is therefore the automatic monitoring of the borehole wall by image acquisition (process 31, FIG. 3). For this workflow, any technology can be used for image acquisition of any resolution, which of course affects the accuracy of the breakout analysis.

Figure 4:
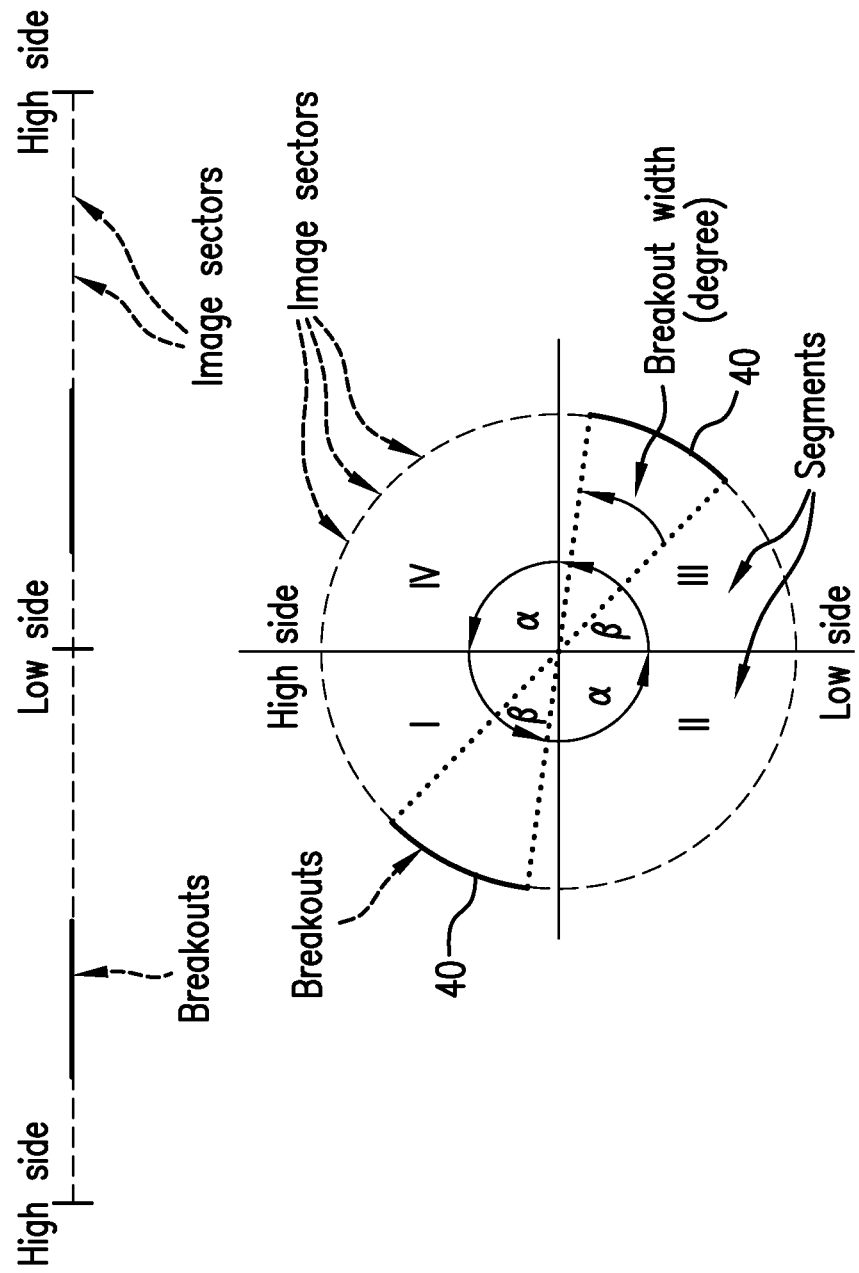
FIG. 4 depicts aspects of dividing image sectors into angular segments.

FIG. 4 defines the nomenclature used to describe an algorithm, presented below, used for automatic detection of breakouts. The lower figure shows a top view of a single row of pixels in a circle that make up the image. The image sectors are represented by the dashed line (as also shown as a linear line in the upper figure). Each dash represents one sector, to which one pixel value of the image is assigned. Pair-wise breakouts are highlighted as circle sections 40, 180 degree apart from each other. The breakout width (see also FIG. 2) is defined as the angle of each of the circle sections 40 at which the breakout exists. Segments are defined as pieces or arcs of the circle, which are labeled segments I-IV. The included angles of segments I-IV are referred to as angles $\alpha$ and $\beta$, the sum of the segment angles ($2\alpha+2\beta$) of the circle add up to 360 degrees. Alternatively, the included angles of segments I-IV may all slightly differ from each other, as long as they sum up to 360 degrees.

An algorithm is presented herein for the automatic detection of such pair-wise breakouts. The algorithm can be applied to any image, irrespective of the applied technology for image acquisition. Also, the algorithm analyzes only one image row at a particular depth, irrespective of the existence of breakouts above the depth under consideration (i.e., analysis of only one row in FIG. 2). This setup makes the algorithm applicable to an implementation into firmware in the downhole tool 10. Such an implementation allows for the automatic monitoring of the borehole status (i.e., breakout or no breakout), and the automatic generation of alerts whenever breakouts are detected. Compared to the image analysis at the surface for which high-resolution image data need to be transmitted via the telemetry system 13, this algorithm drastically reduces the amount of information that needs to be transmitted to the surface.

The algorithm includes the following steps with reference to FIGS. 4-7:

Step 1—Optionally, filter or smooth the image data by applying any filtering or smoothing algorithm to the image data. If the pixel values of the image represent the resistivity of the formation borehole wall, the filter may be applied to the logarithm of the pixel values. Otherwise, the filter may be applied to the pixel values themselves. Also, filtering may be applied automatically to the image, depending on the image quality. The image quality can be quantified by a statistical parameter such as kurtosis.

Step 2—Sub-divide the image row into four segments I-IV including the angles $\alpha$, $\beta$. The angles diagonally opposed to each other are equal, and all angles sum up to 360 degrees.

Step 3—Depending on subsequently used approaches, normalize (and, optionally, invert) the pixel values between the maximum and minimum of pixel values. Inversion should be performed when the breakouts are represented by low pixel values, compared to the locations where no breakouts exist. If breakouts are represented by high pixel values on the image, inversion should not be applied.

Step 4—Beginning with equal angles included by the segments, $\alpha=\beta=90$ degrees, calculate the average of the physical property for each of the four segments I-IV. Different types of averages can be calculated, including the harmonic, arithmetic, geometric, etc. averages.

Step 5—Stack the averages of opposed segments, i.e., stack the averages from segments I and III, as well as II and IV, respectively. Different methods can be used for stacking.

Step 6—Rotate the relative position between the image and the four segments (FIG. 5) by one or more sectors, keeping the angles between the segments constant. Then, repeat steps 2-5.

Step 7—After rotation by 90 degrees (in case of equal angles $\alpha=\beta=90$ degrees between the segments) or 180 degrees (in case of unequal angles $\alpha\neq\beta$), find the maximum or minimum stack, depending on the applied approaches for normalization and inversion. Also, find the angle of rotation at which the maximum/minimum (i.e., maximum or minimum) stack was found. The maximum/minimum stack is found at the position of the breakout.

Step 8—Change the angles between the segments (FIGS. 6A and 6B) by a small amount (for example by one sector), so that $\alpha\neq\beta$, and repeat steps 1-6. However, repeat the steps 2-7 until the relative position between the image and the segments reaches 180 degrees.

Figure 5:
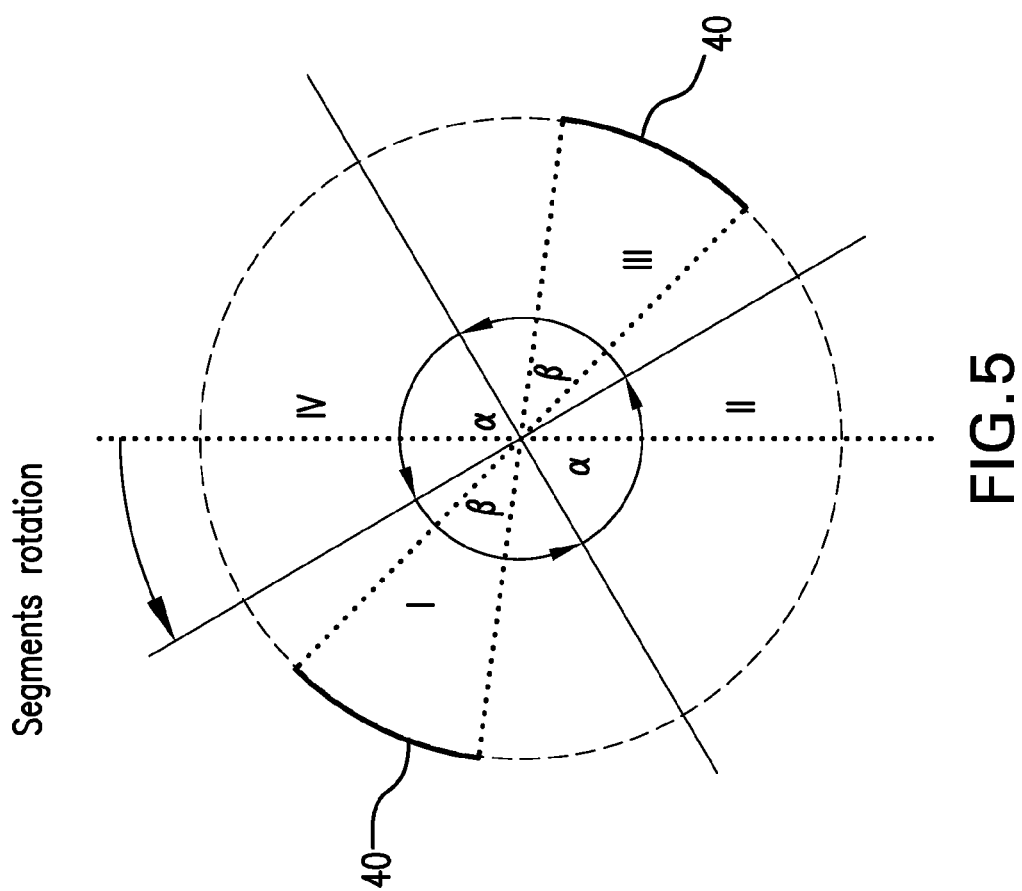
FIG. 5 depicts aspects of rotating the angular segments with respect to the breakouts.

Step 9—Out of all combinations of rotation (step 6) and angle changes (step 8), find the orientation and the angle between the segments at which the stacks become a maximum/minimum. At the combination that provides the maximum/minimum stack, the orientation of the segments defines the breakout positions around the boreholes, and the angle between the segments determines the width of the breakouts (FIG. 5). Steps 6-8 may be applied in reverse order, i.e., first changing the angles between the segments, and then rotating the image.

Figure 7:
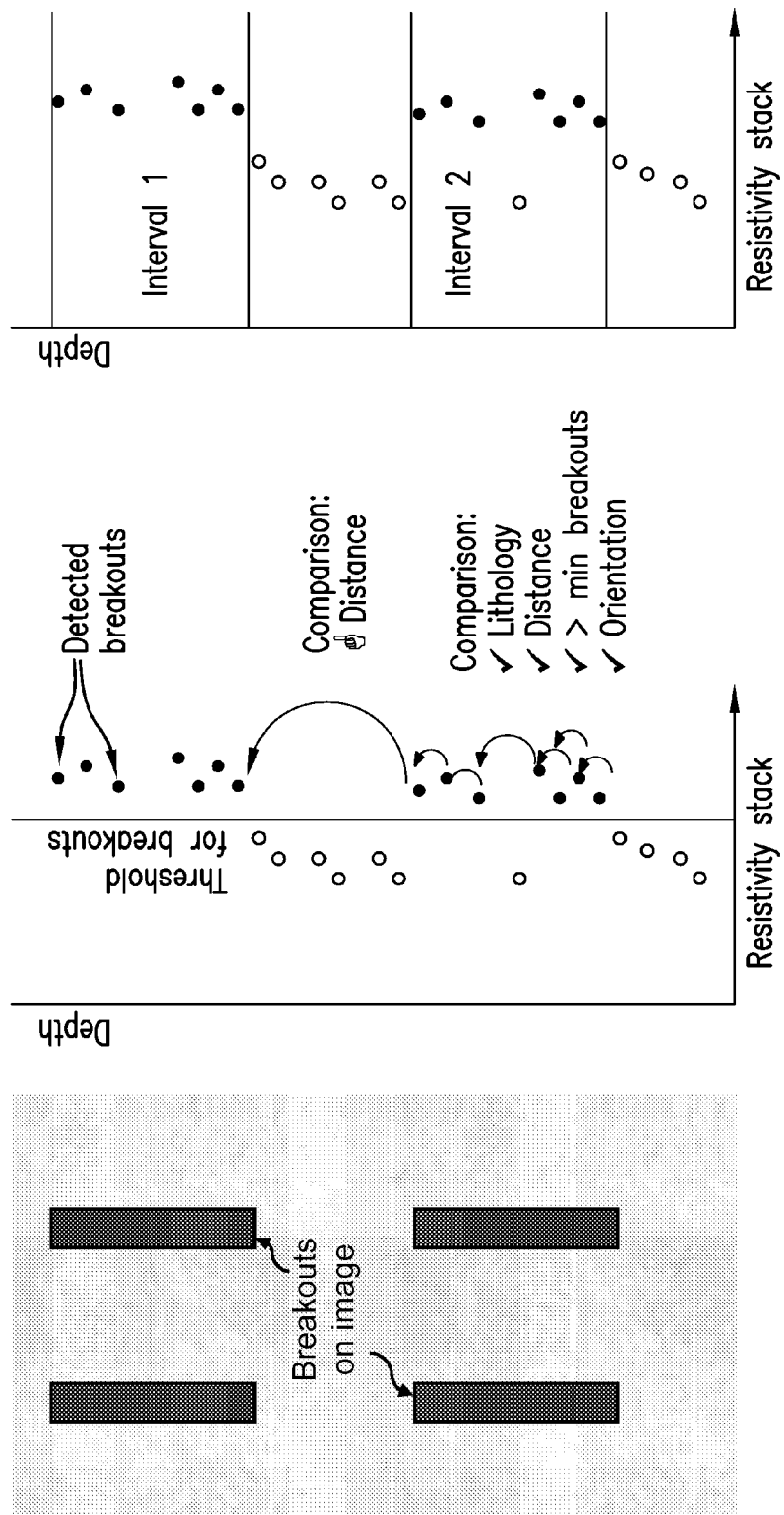
FIG. 7 depicts aspects of creating breakout intervals from breakouts shown on an image.

Step 10—If multiple breakouts were detected on multiple image rows, those breakouts are clustered into a breakout interval as illustrated in FIG. 7. If depth information is available, the location of the breakout interval is assigned to the interval. Among others, attributes such as a start depth, an end depth, a center depth, the lithology of the breakout interval wherein the breakout cluster resides, the time since drilling the depth of the breakout interval, and the pressure range of the breakout interval are assigned to the breakout interval.

Step 11—If a breakout interval has been identified, an average width and orientation is calculated from the widths and orientations of each breakout within that breakout interval as illustrated in FIG. 7. Different methods for averaging may be applied. In particular, one option is to use a weighting average function, which weights the breakout widths and orientations of each breakout by the stacking value.

Step 12—Assign an uncertainty to the parameters—width and orientation—for the breakout intervals, for example by statistically analyzing the widths and orientations of the breakouts within each interval.

Among others, the following methods can be used for normalization (norm) of each pixel value Isec where each pixel value relates to one sector as shown in FIG. 4.

Normalization Method 1—Normalize each pixel value according to minimum(min)/maximum(max) values:

$$I\sec(norm) = \frac{I\sec - I\min}{I\max - I\min}$$

Normalization Method 2—Normalize each pixel value according to min/max values and invert:

$$I\sec(norm) = 1 - \frac{I\sec - I\min}{I\max - I\min}$$

Normalization Method 3—Normalize each pixel value according to min/max values and invert, and then take the square (preferred method in one embodiment):

$$I\sec(norm) = \left(1 - \frac{I\sec - I\min}{I\max - I\min}\right)^2$$

Normalization Method 4—Normalize each pixel value according to min/max values, and then take $\log_{10}$:

$$I\sec(norm) = \log_{10}\frac{I\sec - I\min}{I\max - I\min}$$

Normalization Method 5—Normalize each pixel value according to min/max values, and then take the square:

$$I\sec(norm) = \left(\frac{I\sec - I\min}{I\max - I\min}\right)^2$$

Among others, the following methods can be used for averaging normalized pixel values for each of the four segments as shown in FIG. 4.

Averaging Method 1—Average the normalized pixel values for each of the 4 segment:

$$av_i = \frac{1}{n}\sum I\sec(norm),$$

i=1, 2, 3, 4 where n=number of sectors in segment i

Averaging Method 2—Average the logarithms of the normalized pixel values for each of the 4 segments:

$$av_i = \frac{1}{n}\sum \log_{10}(I\sec(norm)),$$

i=1, 2, 3, 4 where n=number of sectors in segment i

Among others, the following methods can be used for stacking the average of the normalized pixel values from opposite segments as shown in FIG. 4.

Stacking Method 1—Stack averages from opposite segments, subtract the stacks, and take the absolute value:

stack=$(av_1+av_3)-(av_2+av_4)$

Stacking Method 2—Stack averages from opposite segments, divide the two resulting stacks and determine the minimum (this method applies only to Normalization Methods 2 and 3):

stack1=$(av_1+av_3)/(av_2+av_4)$ stack2=$(av_2+av_4)/(av_1+av_3)$ stack=min(stack1,stack2)

Stacking Method 3—Stack averages from opposite segments and determine the minimum (applies only to Normalization Methods 1, 4 and 5):

stack1=$(av_1+av_3)$ stack2=$(av_2+av_4)$ stack=min(stack1,stack2)

Stacking Method 4—Stack averages from opposite segments and determine the maximum (applies only to Normalization Methods 2 and 3):

stack1=$(av_1+av_3)$ stack2=$(av_2+av_4)$ stack=max(stack1,stack2)

Stacking Method 5—Stack averages from opposite segments, divide the two resulting stacks and determine the minimum (applies to Normalization Methods 1, 4 and 5):

stack1=$(av_1+av_3)/(av_2+av_4)$ stack2=$(av_2+av_4)/(av_1+av_3)$ stack=max(stack1,stack2)

Figure 8:
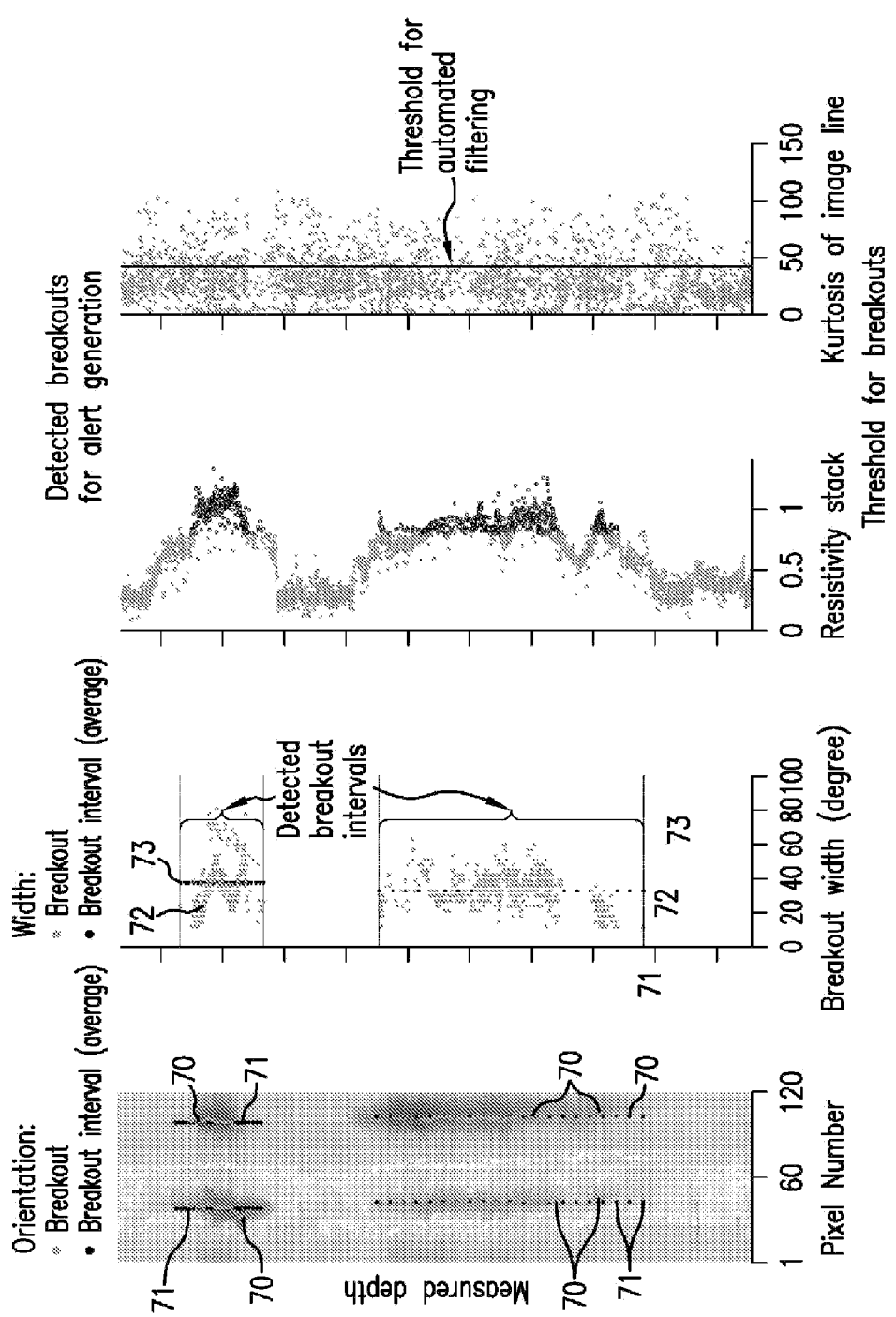
FIG. 8 depicts aspects of processed and analyzed image data illustrating detection of breakouts.

FIG. 8 shows the result of the automatic identification of borehole breakouts using Normalization Method 3, Averaging Method 1, and Stacking Method 1 for a varying angle between the segments. The left-most track shows the image with the borehole breakouts and the orientation of the breakouts (the dots 70) on top of the image. The dots 71 show the average orientation of the two identified breakout zones. The second track from left shows the breakout intervals and the widths of each breakout (dots 72), as well as average widths for each breakout interval (dots 73). The third track from left shows the maximum of the stacking routine. A breakout is identified when the maximum exceeds the threshold value of 0.8, which is an empirically determined value in one embodiment. The right track shows the kurtosis for each image row. The kurtosis is one statistical parameter that can be used to automatically apply filtering/smoothing (Step 1) once the kurtosis exceeds a pre-defined threshold.

Once a breakout has been detected, different levels of alert can be provided, depending on the configuration of the algorithm (process 33 in FIG. 3). Level 1: an alert may be generated which informs a user that a breakout has been detected (no parameters delivered). Such an alert can be a trigger to change the telemetry configuration to transmit higher resolution images for more detailed analysis. If a breakout orientation is also delivered (level 2 in process 33, FIG. 3), subsequent breakouts are monitored (memorized or recorded) until a breakout zone (depth interval) can be identified (process 34, FIG. 3). The orientation of the breakout zone can then be used to calibrate the orientation of the in-situ Earth stresses. Level 3 triggers the monitoring of subsequent alerts (process 35, FIG. 3). If a breakout zone is identified, the pressure and temperature range prevailing in the time the zone was drilled needs to be determined (process 36, FIG. 3) for use in calibrating the in-situ Earth stresses. In addition, different levels of alerts can be generated based on the magnitude of the detected breakouts. Magnitudes of different breakouts can be compared to various thresholds corresponding to the different alert levels. In one or more embodiments, three alert levels can be provided to an operator—no significance (continue drilling), minor significance (caution), and major significance (serious incident expected). These are only examples as one skilled in the art can create other alerts and alarms corresponding to equipment, methods and parameters of interest using the techniques disclosed herein.

The automatic generation of alerts in addition to the downhole image data analysis includes monitoring the drilling status (either downhole by the tool 10 or at the surface by the surface computer processing system 8 once a detected breakout has been transmitted). The drilling status can include pressure and temperature at the detected breakouts.

In addition to the features presented in FIG. 3, the engineering application system also provides the following applications in order to handle operating constraints.

A first application is provided to deliver the geometry of the borehole (inclination, azimuth, dogleg severity and others), in order to circumvent the analysis of asymmetric images (images on which one breakout is less pronounced than its counterpart). Also, the first application is able to predict whether formation beds are penetrated perpendicular or inclined. If the borehole penetrates the formation beds in an inclined angle, a second application is provided which is able to perform dip removal on the image, in order to circumvent alerts arising from inclined beds but not from breakouts.

A third application is provided which is able to deliver the drilling status. That application can control the activation of the automatic image analysis, in order to exclude the analysis of images acquired while not drilling or re-logging.

A fourth application is provided to provide information related to detecting the breakouts for the purpose of calibrating the pressure window. The pressure window relates to a range of drilling fluid pressures having an upper bound (fracture gradient) and two lower bounds (shear failure gradient or pore pressure gradient). The shear failure gradient can be determined from the breakout information and other drilling parameters associated with the breakout.

The techniques disclosed herein have the benefit of being robust in a way that only significant, clearly visible breakouts are detected, which circumvents false alerts. In addition, the approach only alerts whenever breakouts occur as a pair, approximately 180 degrees shifted. This latter benefit circumvents the false detection of key seating.

In support of the teachings herein, various analysis components may be used, including a digital and/or an analog system. For example, the downhole electronics 8 or the surface computer processing system 9 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second," and "third" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for detecting a first breakout and a second breakout shifted apart from the first breakout in a borehole penetrating an earth formation, the method comprising:

conveying a downhole tool configured to perform measurements of a property of the earth formation through the borehole using a carrier;

producing an image of the earth formation from the measurements, the image comprising a plurality of sectors;

dividing the sectors into a plurality of radial segments, each segment corresponding to an opposite segment of a different sector;
rotating the segments at least one sector at a time until a specified angle is achieved;
calculating a value for the measurements associated with each segment for each rotation of the segment by at least one sector;
stacking the values for opposing segments to produce stack values;
determining a maximum or minimum stack value;
determining if the maximum or minimum stack value exceeds a threshold value; and
detecting the first breakout and the second breakout if the maximum or minimum stack value exceeds the threshold value; and
providing an output signal to a user interface alerting a user to the detection of the first breakout and the second breakout if the first breakout and the second breakout are detected;
wherein the producing, dividing, rotating, calculating, stacking, determining a maximum or minimum stack value, determining if the maximum or minimum stack value exceeds a threshold value, and detecting are implemented by a processor.

2. The method according to claim 1, further comprising determining an angle of rotation at which the maximum or minimum stack value occurs wherein the angle of rotation determines an orientation of the first breakout and the second breakout within the borehole.

3. The method according to claim 1, further comprising determining a width of the first breakout and/or second breakout.

4. The method according to claim 3, further comprising clustering detected breakouts into one or more breakout intervals, each breakout interval being assigned an average orientation, an average width, and/or an uncertainty.

5. The method according to claim 1, further comprising associating the image with a depth in the borehole at which the image was obtained.

6. The method according to claim 1, further comprising associating a depth in the borehole with each of the first breakout and the second breakout.

7. The method according to claim 1, wherein the method is implemented in the downhole tool using the image, the image being stored in a memory in the downhole tool.

8. The method according to claim 7, further comprising transmitting data related to the detection of the first breakout and/or the second breakout to the surface of the earth using a telemetry system.

9. The method according to claim 1, further comprising transmitting the image to a computer processing system at the surface of the earth and implementing the detecting of the first breakout and the second breakout with the computer processing system.

10. The method according to claim 1, further comprising transmitting a signal to an operator upon detection of the first breakout and the second breakout.

11. The method according to claim 10, wherein the signal comprises data related to a magnitude of the first and second breakouts.

12. The method according to claim 11, further comprising comparing the magnitude to one or more threshold values and transmitting an alarm based on the comparison.

13. The method according to claim 1, further comprising determining a pressure window for drilling fluid using data from the detecting of the first and second breakouts, the data comprising a depth of the first and second breakouts, a rotation of the first and second breakouts, a width of the first and second breakouts, and/or a width and orientation of a breakout interval comprising multiple breakouts.

14. The method according to claim 13, further comprising determining a shear failure gradient from the data for use as a lower bound of the pressure window.

15. The method according to claim 1, wherein the second breakout is shifted approximately 180° apart from the first breakout.

16. The method according to claim 1, wherein the value is an average value.

17. The method according to claim 1, wherein the image is a data set.

18. An apparatus for detecting a first breakout and a second breakout shifted apart from the first breakout in a borehole penetrating an earth formation, the apparatus comprising:
a downhole tool configured to be conveyed through the borehole, to perform measurements of a property of the earth formation, and to produce an image of the earth formation from the measurements, the image comprising a plurality of sectors; and
a processor configured to implement a method comprising:
receiving the image;
dividing the sectors into a plurality of radial segments, each segment corresponding to an opposite segment of a different sector;
rotating the segments at least one sector at a time until a specified angle is achieved;
calculating a value for the measurements associated with each segment for each rotation of the segment by at least one sector;
stacking the values for opposing segments to produce stack values;
determining a maximum or minimum stack value;
determining if the maximum or minimum stack value exceeds a threshold value;
detecting the first breakout and the second breakout if the maximum or minimum stack value exceeds the threshold value and;
providing an output signal to a user interface alerting a user to the detection of the first breakout and the second breakout if the first breakout and the second breakout are detected.

19. The apparatus according to claim 18, wherein the property comprises at least one of gamma ray emission, acoustic impedance, acoustic travel time, resistivity, conductivity, density, and porosity.

20. The apparatus according to claim 18, wherein the downhole tool is configured for wireline logging or logging-while-drilling.

21. The apparatus according to claim 18, wherein the apparatus is configured to associate the image with a depth in the borehole at which the image was obtained.

22. The apparatus according to claim 18, wherein the processor is further configured to:
determine an angle of rotation at which the maximum or minimum stack value occurs wherein the angle of rotation determines an orientation of the first breakout and the second breakout within the borehole;
determine a width of the first breakout and/or the second breakout;
group detected breakouts into one or more breakout intervals, each breakout interval being assigned an average orientation, an average width, and/or an uncertainty; and/or transmit a signal when the first and second breakouts are detected.

23. The apparatus according to claim 18, wherein the second breakout shifted approximately 180° apart from the first breakout.

24. The apparatus according to claim 18, wherein the value is an average value.

25. The apparatus according to claim 18, wherein the image is a data set.

26. A non-transitory computer-readable medium comprising computer-executable instructions for detecting a first breakout and a second breakout shifted apart from the first breakout in a borehole penetrating an earth formation by implementing a method comprising:
    receiving an image of the earth formation created from measurements of a property of the earth formation using a downhole tool conveyed in the borehole, the image comprising a plurality of sectors;
    dividing the sectors into a plurality of radial segments, each segment corresponding to an opposite segment of a different sector;
    rotating the segments at least one sector at a time until a specified angle is achieved;
    calculating a value for the measurements associated with each segment for each rotation of the segment by at least one sector;
    stacking the values for opposing segments to produce stack values; determining a maximum or minimum stack value;
    determining if the maximum or minimum stack value exceeds a threshold value;
    detecting the first breakout and the second breakout if the maximum or minimum stack value exceeds the threshold value;
    providing an output signal to a user interface alerting a user to the detection of the first breakout and the second breakout if the first breakout and the second breakout are detected.

27. The non-transitory computer-readable medium according to claim 26, wherein the second breakout is shifted approximately 180° apart from the first breakout.

28. The non-transitory computer-readable medium according to claim 26, wherein the value is an average value.

29. The non-transitory computer-readable medium according to claim 26, wherein the image is a data set.

* * * * *